Figure 1:
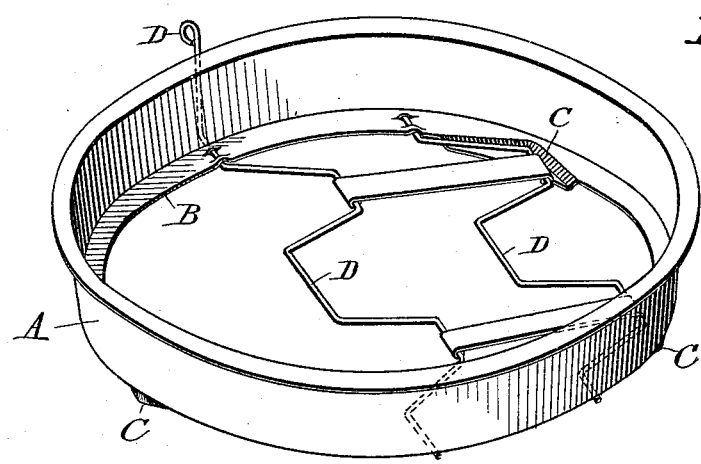

(No Model.)

L. R. SMITH.
BAKE PAN.

No. 547,865. Patented Oct. 15, 1895.

Witnesses:
Chas. E. Godfrey
Louis J. Meyer

Inventor:
Lloyd R. Smith

UNITED STATES PATENT OFFICE.

LLOYD R. SMITH, OF PHILADELPHIA, PENNSYLVANIA.

BAKE-PAN.

SPECIFICATION forming part of Letters Patent No. 547,865, dated October 15, 1895.

Application filed March 2, 1895. Serial No. 540,378. (No model.)

*To all whom it may concern:*

Be it known that I, LLOYD R. SMITH, a citizen of the United States, residing at Philadelphia, in the county of Philadelphia and State of Pennsylvania, have invented certain new and useful Improvements in Bake-Pans; and I do hereby declare that the following is a full, clear, and exact description of the same, reference being had to the annexed drawings, which form part of this specification, and to the letters of reference marked thereon.

My invention relates to that class of bakepans having removable bottoms.

The object of my invention is a pan particularly intended for cake and pie baking so constructed as to prevent the bottom becoming overheated; also to provide a means whereby the baked pastry may be speedily removed without danger of mutilation by placing the same in a position convenient for handling. These objects I attain by the construction substantially as shown in the drawings, similar letters indicating like parts throughout the several views, to which reference is made, the benefits of same being hereinafter described.

Figure 2:
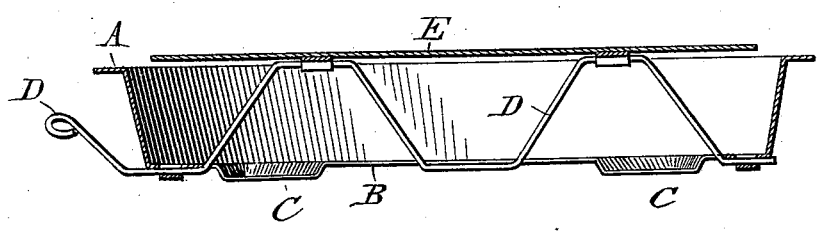
Figure 3:
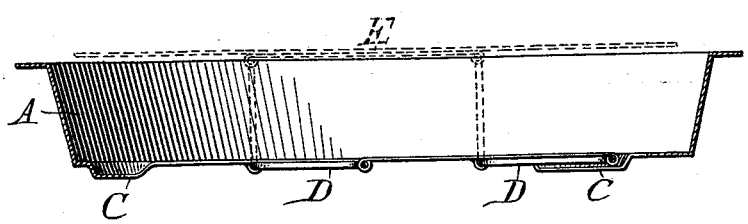

In the accompanying drawings, Figure 1 is a perspective view with the bottom of the pan removed. Fig. 2 is a sectional view showing the bottom of the pan and the lever in a raised position. Fig. 3 is a sectional view showing the lever lowered, and in dotted lines in a raised position.

Coming now to a more detailed description, the letter A denotes the rim or sides of pan; B, the flange on lower inner side of rim to which lever is attached and upon which the removable bottom rests; C, projections on under side of flange, which support pan; D, lever device for lifting bottom above top rim of pan; E, removable bottom. The projections C, three in number, equal distance apart on under side of flange, prevent the sides and bottom of pan coming in direct contact with oven-bottom, thereby securing a free circulation of surrounding air underneath pan, which insures even and thorough baking.

The lever device facilitates the removal of the baked pastry, avoids danger of mutilating the same, and places it in a most convenient and accessible position for handling without being obliged to resort to the various slow and inconvenient methods now in use—such as placing the pan over a cup, allowing rim to fall off, or turning pan over, allowing bottom to fall out, &c.—which increase chances of mutilation, are inconvenient, and slow in operation. By the use of my lever device the bottom is lifted above and entirely clear of top rim of pan, thereby placing it, as may be readily seen, in a most convenient and accessible position to handle. This lever device serves a double purpose. It not only is used for lifting the bottom and contents above the top rim of pan, but it also forms a substantial support for same after it is so lifted, holding cake in a convenient and accessible position, whereby the top and sides may be iced or otherwise handled without interference. As my lever device performs its work by simply pushing the handle from a perpendicular to a horizontal position, the removal of the cake requires but a moment's time and is done without inconvenience and without mutilation. This lever device is made of wires bent in the required shape and of sufficient strength. Fig. 1 shows the lever and the shape in which the wire is bent. A second wire bent in like manner, without handle part, acts as an auxiliary to lever proper, being connected to same by bands or other means.

I do not wish to be understood as confining my invention to its application to cake and pie pans solely, as it is equally applicable to all forms of pans having removable bottoms which rest on a flange.

Having thus fully described my invention, what I claim as new, and desire to secure by Letters Patent, is—

1. The combination with a pan having a vertically removable bottom; of means for lifting said bottom, substantially as described.

2. The combination with a pan, having a vertically removable bottom; of a lever for lifting said bottom substantially as described.

3. The combination with a pan having a vertically movable bottom; of a lever fulcrumed in the pan; an auxiliary lever also fulcrumed in said pan, and means for uniting said levers whereby they are caused to move together.

4. The combination with a pan having a vertically removable bottom; of a lever fulcrumed in the pan; an auxiliary lever also fulcrumed in said pan and means for uniting said levers whereby they are caused to move together; the said levers and uniting means being arranged below the movable bottom of the pan substantially as described.

In testimony whereof I affix my signature in the presence of two witnesses.

LLOYD R. SMITH.

Witnesses:
W. E. OLIVER,
F. G. SHAW.